(12) United States Patent
Nagasawa

(10) Patent No.: US 10,569,732 B2
(45) Date of Patent: Feb. 25, 2020

(54) ARM REST

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 100 days.

(21) Appl. No.: 15/873,224

(22) Filed: Jan. 17, 2018

(65) Prior Publication Data

US 2018/0281725 A1 Oct. 4, 2018

(30) Foreign Application Priority Data

Mar. 31, 2017 (JP) ................................. 2017-070885

(51) Int. Cl.
*B60R 21/207* (2006.01)
*B60R 21/231* (2011.01)
(Continued)

(52) U.S. Cl.
CPC .............. *B60R 21/207* (2013.01); *B60N 2/79* (2018.02); *B60R 21/231* (2013.01); *B60N 2/753* (2018.02);
(Continued)

(58) Field of Classification Search
CPC ................ B60R 21/207; B60R 21/231; B60R 2021/022; B60R 2021/0009;
(Continued)

(56) References Cited

U.S. PATENT DOCUMENTS 3,623,768 A * 11/1971 Capener ................ B60R 21/207
 297/330
5,375,908 A * 12/1994 Goor ....................... B60R 21/01
 297/216.11
(Continued)

FOREIGN PATENT DOCUMENTS

DE 198 50 756 A1 5/2000
JP S58-44247 U1 3/1983
(Continued)

OTHER PUBLICATIONS

Office Action received in Japanese Patent Application No. 2017-070885 dated Nov. 13, 2018 (2 pages in Japanese with English translation).

*Primary Examiner* — Laura Freedman
(74) *Attorney, Agent, or Firm* — Smith, Gambrell & Russell, LLP

(57) ABSTRACT

An arm rest attachable to a seat for a vehicle occupant to sit on includes a pair of side members, a pair of front members, and an airbag. The side members are at left and right sides of the vehicle occupant, extend in a front-rear direction, and are coupled to the seat. The front members are in front of the vehicle occupant and extend inward in a width direction of the seat from the side members. The airbag deploys toward the vehicle occupant from at least one of the pair of side members or the pair of front members. The airbag includes a lateral abutment unit that abuts on the side members and a front abutment unit that abuts on the front members. The airbag has a substantially-triangular cross section taken in a substantially horizontal direction, the cross section including the lateral abutment unit and the front abutment unit.

20 Claims, 4 Drawing Sheets

(51) Int. Cl.
  *B60N 2/75* (2018.01)
  *B60R 21/00* (2006.01)
  *B60R 21/02* (2006.01)
(52) U.S. Cl.
  CPC ....... *B60N 2/767* (2018.02); *B60R 2021/0044* (2013.01); *B60R 2021/0048* (2013.01); *B60R 2021/022* (2013.01); *B60R 2021/0293* (2013.01); *B60R 2021/23107* (2013.01)
(58) Field of Classification Search
  CPC .... B60R 2021/0023; B60R 2021/0041; B60R 2021/0044; B60R 2021/0048; B60R 2021/0293; B60R 2021/23107; B60N 2/753; B60N 2/767; B60N 2/79; B60N 2/793
  See application file for complete search history.

(56) References Cited

U.S. PATENT DOCUMENTS

| | | | |
|---|---|---|---|
| 5,492,361 A | 2/1996 | Kim | |
| 5,511,850 A * | 4/1996 | Coursey | B60N 2/2839 280/730.1 |
| 5,730,458 A * | 3/1998 | Byon | B60R 19/00 280/730.2 |
| 6,736,455 B1 * | 5/2004 | Zakovic | B60N 2/2839 297/256.15 |
| 10,081,326 B2 * | 9/2018 | Koike | B60R 21/207 |
| 10,232,815 B1 * | 3/2019 | Dry | B60R 21/18 |
| 10,272,865 B2 * | 4/2019 | Nagasawa | B60R 21/18 |
| 2016/0311349 A1 * | 10/2016 | Honda | B60N 2/4235 |
| 2018/0281724 A1 * | 10/2018 | Nagasawa | B60R 21/055 |
| 2018/0281730 A1 * | 10/2018 | Nagasawa | B60R 21/0134 |
| 2019/0106077 A1 * | 4/2019 | Dry | B60N 2/753 |
| 2019/0111877 A1 * | 4/2019 | Line | B60N 2/42 |
| 2019/0118755 A1 * | 4/2019 | Dry | B60N 2/777 |

FOREIGN PATENT DOCUMENTS

| | | |
|---|---|---|
| JP | H02-57737 U1 | 4/1990 |
| JP | 2005-125944 A | 5/2005 |
| JP | 2009-12661 A | 1/2009 |
| JP | 2016-199123 A | 12/2016 |
| JP | 2018171992 A * | 11/2018 |

* cited by examiner

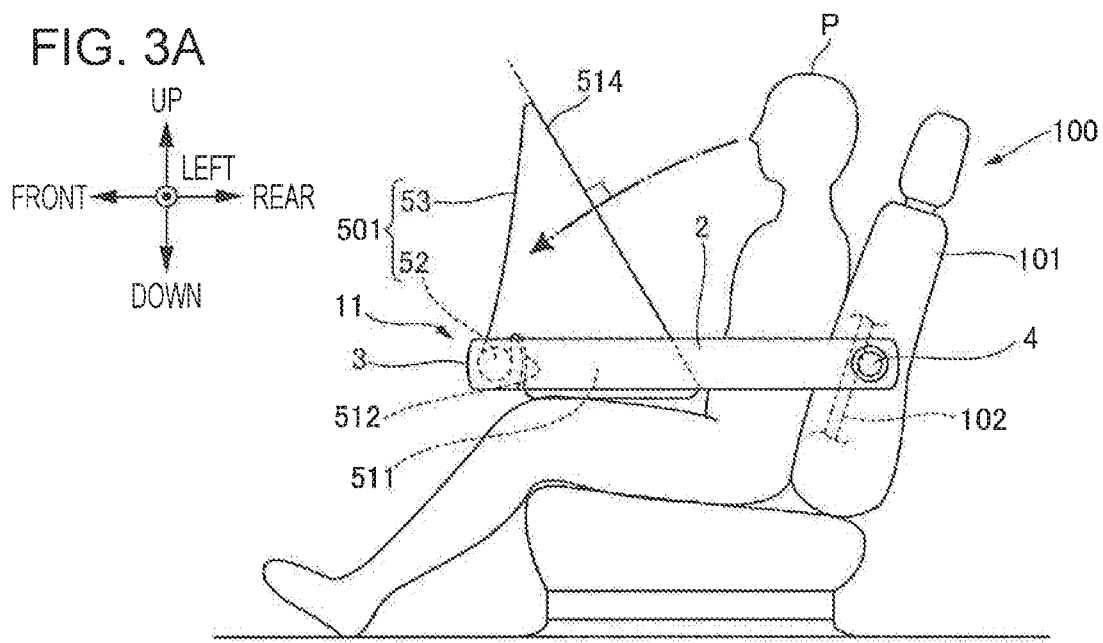
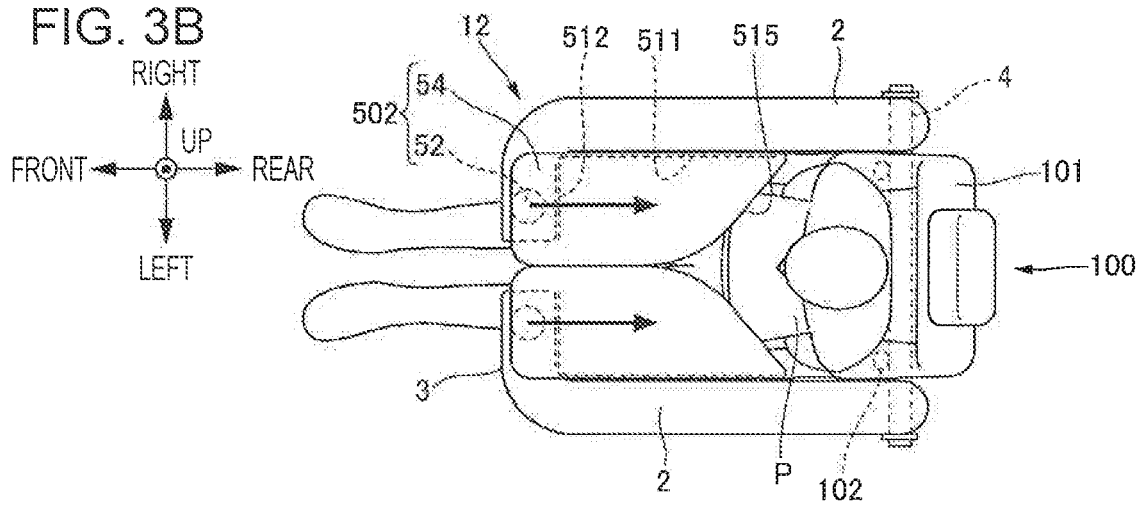
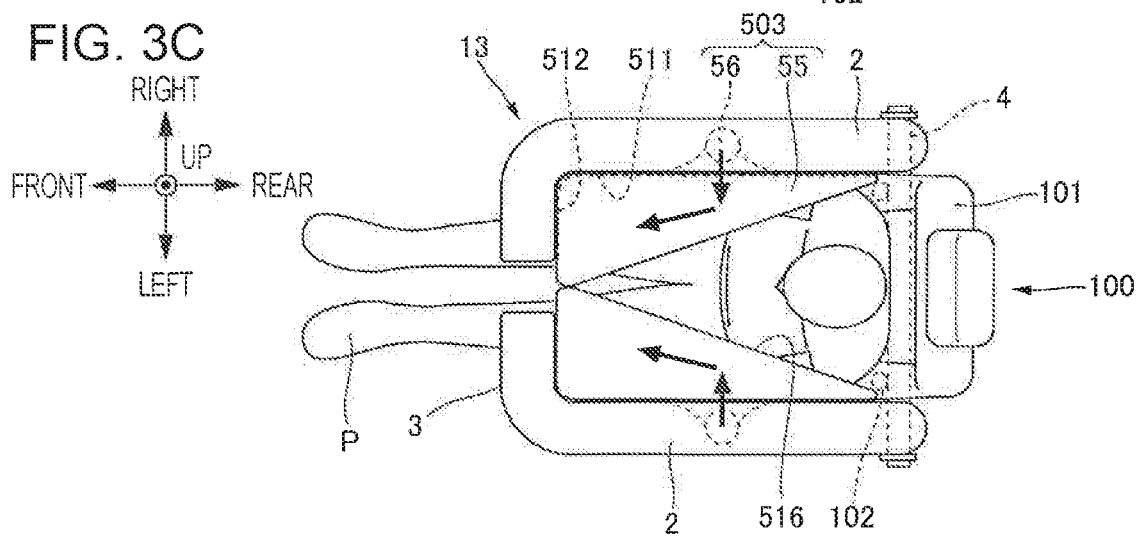

ARM REST

CROSS-REFERENCE TO RELATED APPLICATIONS

The present application claims priority from Japanese Patent Application No. 2017-070885 filed on Mar. 31, 2017, the entire contents of which are hereby incorporated by reference.

BACKGROUND

1. Technical Field

The present invention relates to arm rests, and particularly, to an arm rest that quickly and reliably protects a vehicle occupant by using an airbag having a lower capacity than in the related art.

2. Related Art

Various airbags for protecting vehicle occupants, such as drivers, have been developed. For instance, a vehicle driver-seat airbag device disclosed in Japanese Unexamined Patent Application Publication No. 2016-199123 includes main chamber that deploys in front of the driver and sub chambers that deploy at the lateral sides of the main chamber. With the main chamber and the sub chambers, the driver can be prevented from moving diagonally forward in the event of a collision.

However, for instance, since the front airbag to be deployed from the steering wheel is deployed from a member located distant from the vehicle occupant, there is a demand to improve the restraining effect with respect to the size of the airbag. Specifically, there is room for improvement with respect to the position and the restraining method of a large-capacity airbag that reaches the seated area of the vehicle occupant once the airbag is deployed. Under the existing conditions, the use of an arm rest as a vehicle-occupant protection member is nonexistent or rare.

SUMMARY OF THE INVENTION

It is desirable to provide an arm rest that can quickly and reliably protect a vehicle occupant by using an airbag having a lower capacity than in the related art.

An aspect of the present invention provides an arm rest that is attachable to a seat for a vehicle occupant to sit on and that includes a pair of side members, a pair of front members, and an airbag. The pair of side members are configured to be at left and right sides of the vehicle occupant when the vehicle occupant is seated, extend in a front-rear direction, and are coupled to the seat. The pair of front members are configured to be in front of the vehicle occupant when the vehicle occupant is seated, and extend inward in a width direction of the seat from the pair of side members. The airbag is configured to deploy toward the vehicle occupant from at least one of the pair of side members or the pair of front members. The airbag includes a lateral abutment unit configured to abut on the side members and a front abutment unit configured to abut on the front members. The airbag has a substantially-triangular cross section taken in a substantially horizontal direction, the cross section including the lateral abutment unit and the front abutment unit.

BRIEF DESCRIPTION OF THE DRAWINGS

FIGS. 3A to 3C schematically illustrate arm rests according to other examples of the present invention, FIG. 3A being a side view schematically illustrating a seat equipped with an arm rest having airbags according to another example of the present invention, FIG. 3B being a plan view schematically illustrating a seat equipped with an arm rest having airbags according to another example of the present invention, FIG. 3C being a plan view schematically illustrating a seat equipped with an arm rest having airbags according to another example of the present invention.

DETAILED DESCRIPTION

Basic Example

An arm rest according to an example of the present invention will be described below with reference to FIGS. 1A to 2B.

Figure 1A:
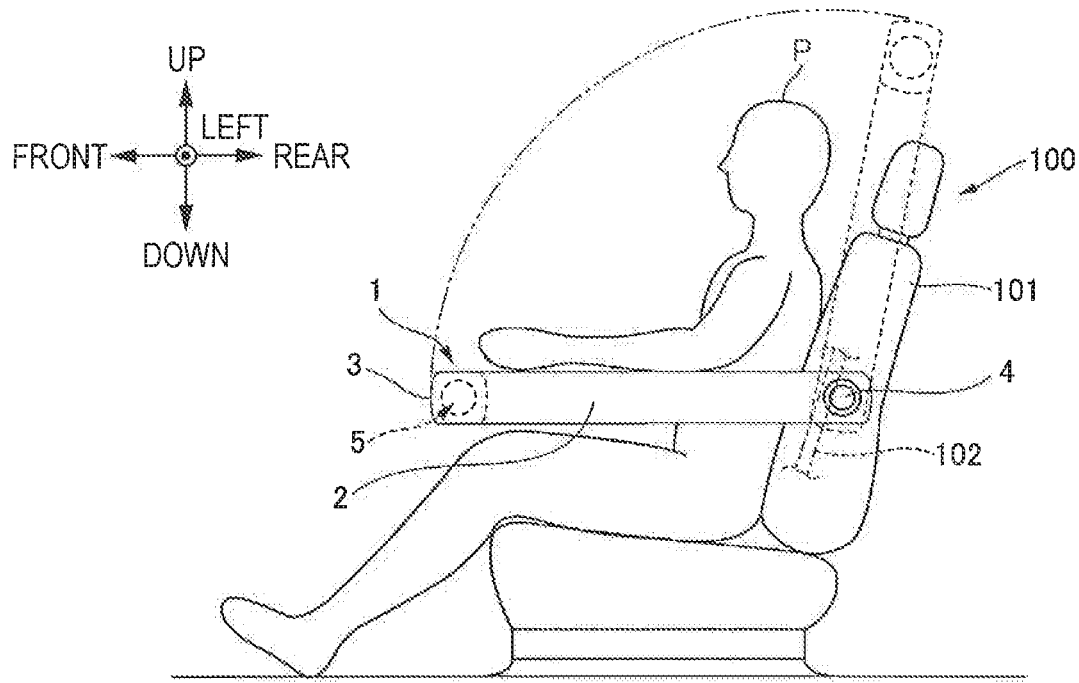
FIGS. 1A and 1B schematically illustrate a seat equipped with an arm rest according to an example of the present invention, FIG. 1A being a side view schematically illustrating the seat, FIG. 1B being a plan view schematically illustrating the seat.
Figure 1B:
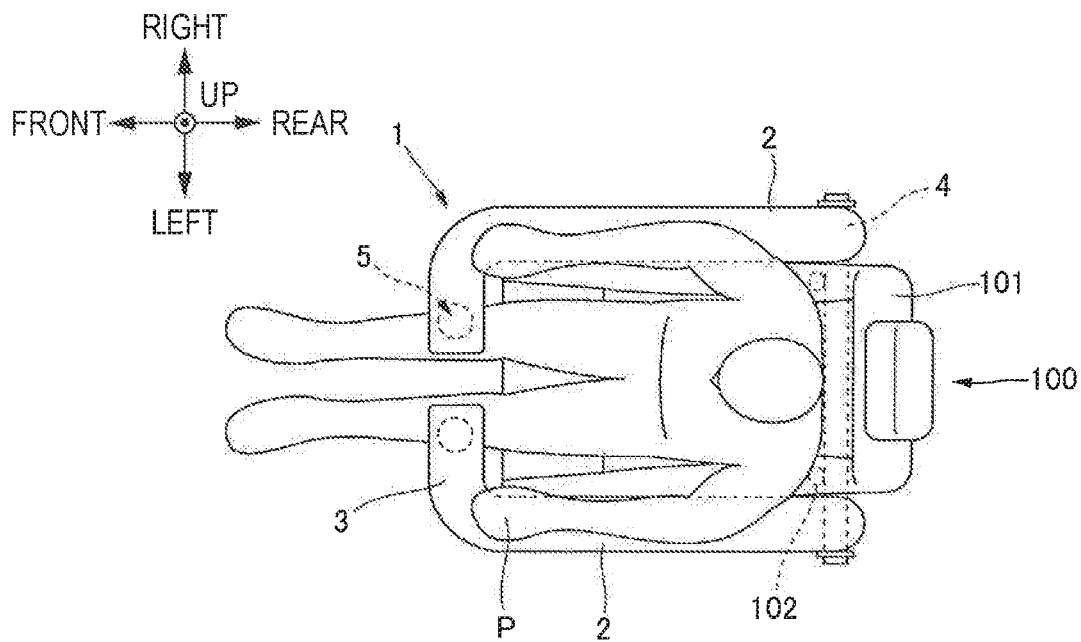
Figure 2A:
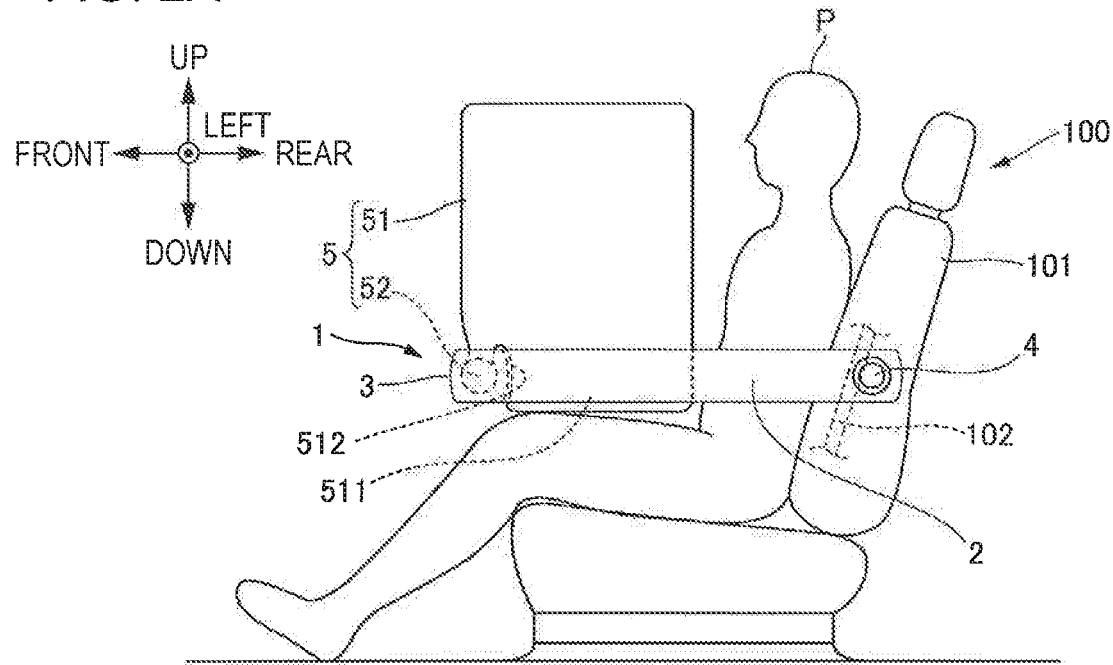
FIGS. 2A and 2B schematically illustrate the seat equipped with the arm rest from which airbags according to an example of the present invention are deployed, FIG. 2A being a side view schematically illustrating the seat, FIG. 2B being a plan view schematically illustrating the seat.
Figure 2B:
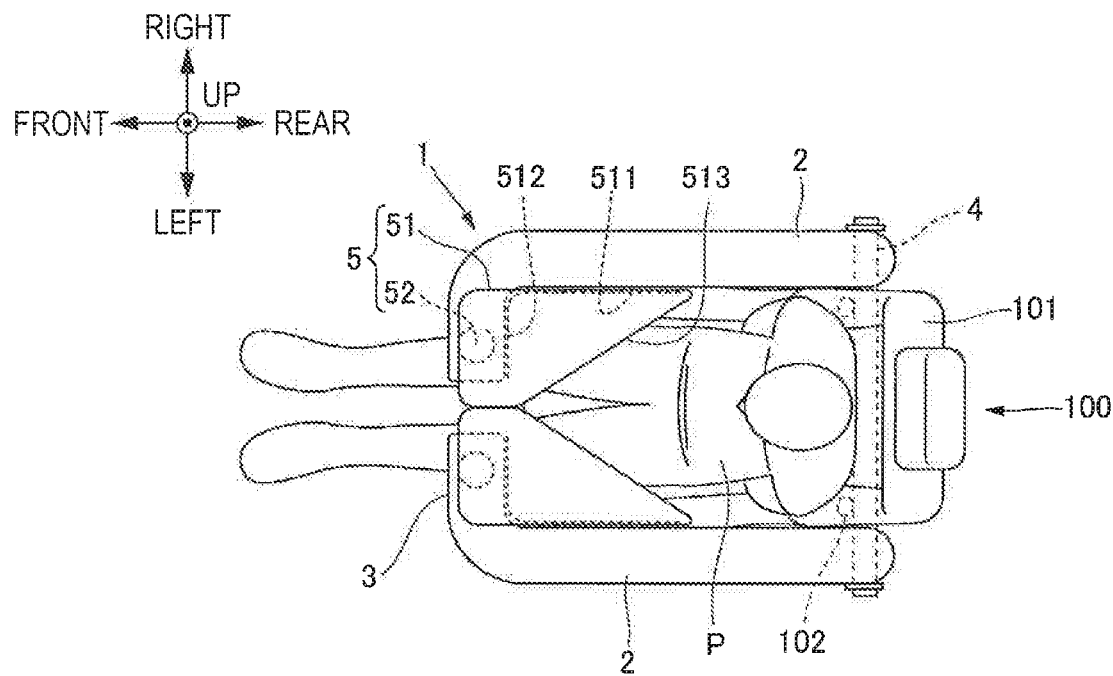

FIGS. 1A and 1B schematically illustrate a seat 100 equipped with an arm rest 1 according to an example of the present invention. FIG. 1A is a side view schematically illustrating the seat 100, and FIG. 1B is a plan view schematically illustrating the seat 100. FIGS. 2A and 2B schematically illustrate the seat 100 equipped with the arm rest 1 from which airbags 5 according to an example of the present invention are deployed. FIG. 2A is a side view schematically illustrating the seat 100, and FIG. 2B is a plan view schematically illustrating the seat 100.

As illustrated in FIGS. 1A and 1B, the arm rest 1 is attached to the seat 100 and has side members 2, front members 3, a rear member 4, and the airbags 5.

The side members 2 are provided as a pair at the left and right sides of a vehicle occupant P and are tubular members extending substantially parallel to the front-rear direction. The extending direction of the side members 2 may be slanted to a certain extent in either one of the vertical direction and the left-right direction relative to the front-rear direction so long as the extending direction is substantially parallel to the front-rear direction.

The front members 3 are tubular members provided in front of the vehicle occupant P. In particular, as illustrated in FIG. 1B, the front members 3 are provided as a pair and protrude inward in the width direction of the seat 100 respectively from the pair of side members 2. In this example, the right front member 3 and the left front member 3 are not coupled to each other.

The rear member 4 couples the seat 100 to the rear ends of the side members 2. The rear member 4 according to this example is a shaft member extending through a seat back 101 in the left-right direction. The left and right ends of the rear member 4 that are exposed from the seat back 101 are respectively coupled to the side members 2. The rear member 4 is securely attached to a seat frame 102 disposed within the seat back 101 so as to be immovable in the front-rear direction, the left-right direction, and the up-down direction of the vehicle.

The side members 2 and the front member 3 are rotatable about a line that connects left and right coupled points between the rear member 4 and the seat back 101. The line connecting the left and right coupled points is substantially parallel to and substantially aligned with the central axis of the rear member 4. In this example, the rear member 4 functions as a hinge. Thus, the side members 2 and the front member 3 when not in use are rotated upward, as indicated by dashed lines in FIG. 1A, so as not to interfere with the boarding and exiting process of the vehicle occupant P. Moreover, when in use, the side members 2 and the front member 3 are rotated downward so that the side members 2 are set substantially parallel to the horizontal direction after the vehicle occupant P is seated, thereby allowing the vehicle occupant P to place his/her arms on the arm rest 1.

The airbags 5 are accommodated inside the front members 3 used as accommodation members, as illustrated in FIGS. 1A and 1B. The airbags 5 are to be deployed from the front members 3 toward the vehicle occupant P, that is, rearward. A description of the deployment method of the airbags 5 will be provided later with reference to FIGS. 2A and 2B illustrating the airbags 5 in their deployed state.

As illustrated in FIGS. 2A and 2B, each airbag 5 has an airbag body 51 and an inflator 52.

The airbag bodies 51 extend to the front side of the upper body and the head of the vehicle occupant P from the respective front members 3 and bulge upward by rupturing the upper surfaces of the front members 3.

The inflators 52 are gas generators provided inside the respective front members 3 and are driven so as to pressure-feed gas into the airbag bodies 51.

In particular, as illustrated in FIG. 2B, the airbag body 51 of each airbag 5 has a lateral abutment unit 511 that abuts on the corresponding side member 2 and a front abutment unit 512 that abuts on the corresponding front member 3. Each airbag body 51 is formed such that a horizontal cross section including the lateral abutment unit 511 and the front abutment unit 512 (i.e., a contour indicated by a dashed line in FIG. 2B), that is, a horizontal cross section at a height at which the airbag body 51 abuts on the corresponding side member 2 and the corresponding front member 3, is substantially triangular. A portion of the airbag body 51 above the side member 2 and the front member 3 deploys above the front member 3 and thus has a substantially-trapezoidal cross section taken in the horizontal direction. Therefore, the overall shape of the airbag body 51 is a combination of a substantially triangular prismatic shape and a substantially rectangular prismatic shape.

A region on which the vehicle occupant P abuts and that is an oblique surface in the aforementioned cross section, that is, either one of a surface formed by connecting predetermined positions of the lateral abutment unit 511 and the front abutment unit 512 and a surface extending therefrom, serves as an occupant abutment unit 513. Although the occupant abutment unit 513 according to this example is a substantially flat surface, various surface configurations may be employed in this example of the present invention so long as the vehicle occupant P can be restrained and an increase in the injury value can be suppressed. For instance, the occupant abutment unit 513 may be a curved surface, an irregular surface, and so on.

The method of using the airbags 5 involves driving the inflators 52 when a collision occurs or when a collision is predicted so as to pressure-feed gas into the airbag bodies 51. Thus, the upper surfaces of the front members 3 are ruptured so that the airbag bodies 51 are deployed toward the vehicle occupant P from the front members 3.

By causing the airbag bodies 51 to deploy toward the vehicle occupant P, the airbag bodies 51 can fill the areas between the front members 3 and the vehicle occupant P. Accordingly, the vehicle occupant P can be restrained by the airbags 5 so that the vehicle occupant P can be protected. Since the airbags 5 can be deployed from a position closer to the vehicle occupant P than existing airbags, such as a front airbag from the steering wheel and a curtain airbag from near the roof, the vehicle occupant P can be protected quickly with a low volume of gas.

With regard to the airbags 5 according to this example, in a case where the vehicle occupant P abuts on the occupant abutment units 513 from the rear side toward the front side due to an impact, the force received by the airbag bodies 51 is transmitted to the side members 2 and the front members 3. Thus, a reactive force is obtained from the side members 2 and the front members 3, so that a favorable support state of the vehicle occupant P can be achieved via the airbag bodies 51.

Supposing that the cross section of each airbag body 51 including the lateral abutment unit 511 and the front abutment unit 512 is rectangular, that is, supposing that the overall shape of the airbag body 51 is substantially rectangular prismatic, the rectangular cross section may become twisted and distorted, depending on the direction in which the vehicle occupant P abuts on the airbag body 51. If this occurs, the pressing force received by the airbag body 51 from the vehicle occupant P becomes less likely to be transmitted reliably and properly to the corresponding side member 2 and the corresponding front member 3 via the lateral abutment unit 511 and the front abutment unit 512.

In contrast, in this example, each airbag body 51 has a substantially triangular cross section so that the force received by the occupant abutment unit 513 is transmitted to the corresponding side member 2 and the corresponding front member 3 via the lateral abutment unit 511 and the front abutment unit 512 without distortion in the cross-sectional shape, such as twisting. With the airbag body 51 having the aforementioned substantially-triangular cross section, the vehicle occupant P can be reliably and favorably supported by the reactive force obtained from the side member 2 and the front member 3 even if the direction in which the vehicle occupant P abuts on the airbag body 51 is a diagonal direction in addition to a forward direction.

Because the rear member 4 is fixed to the seat frame 102 in this example, the arm rest 1 is less likely to be positionally displaced by, for instance, an impact caused by a collision. Moreover, ever if an incoming object in the vehicle cabin hits against the arm rest 1, the arm rest 1 can exhibit a reactive force against the incoming object. Furthermore, the side members 2, the front members 3, and the rear member 4 according to this example are provided as rigid members. By having rigidity, the side members 2 and the front members 3 are less like likely to deform even when an incoming object comes into contact with the members in the event of a collision, thus protecting the vehicle occupant P. In addition, the rear member 4 is less likely to become detached from the seat 100 when an incoming object comes into contact with the side members 2 in the event of a collision.

In a case where the arm rest 1 is applied to a vehicle equipped with either one of an automated driving system and a driving support system, the side members 2 and the front members 3 preferably have a shape such that the arms of the vehicle occupant P, a book, an electronic terminal, and so on can be placed or are readily placeable on the side members 2 and the front members 3. Moreover, as an alternative to the example illustrated in FIGS. 1A to 2B in which the rear member 4 is a single shaft member, the rear member 4 according to this example of the present invention may be split members and does not have to extend through the seat back 101.

Modifications of the arm rest according to the example of the present invention will now be described with reference to FIGS. 3A to 4C.

Figure 4A:
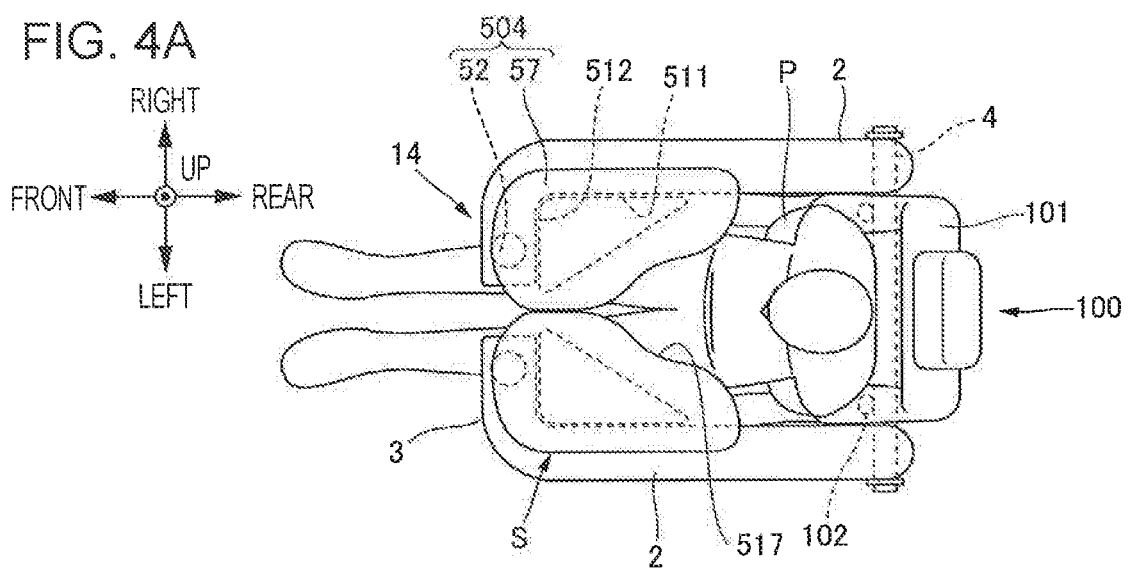
FIGS. 4A to 4C schematically illustrate a seat equipped with an arm rest from which airbags according to an example of the present invention are deployed, FIG. 4A being a plan view schematically illustrating the seat, FIG. 4B being a side view schematically illustrating the seat, FIG. 4C being a front view schematically illustrating the seat.
Figure 4B:
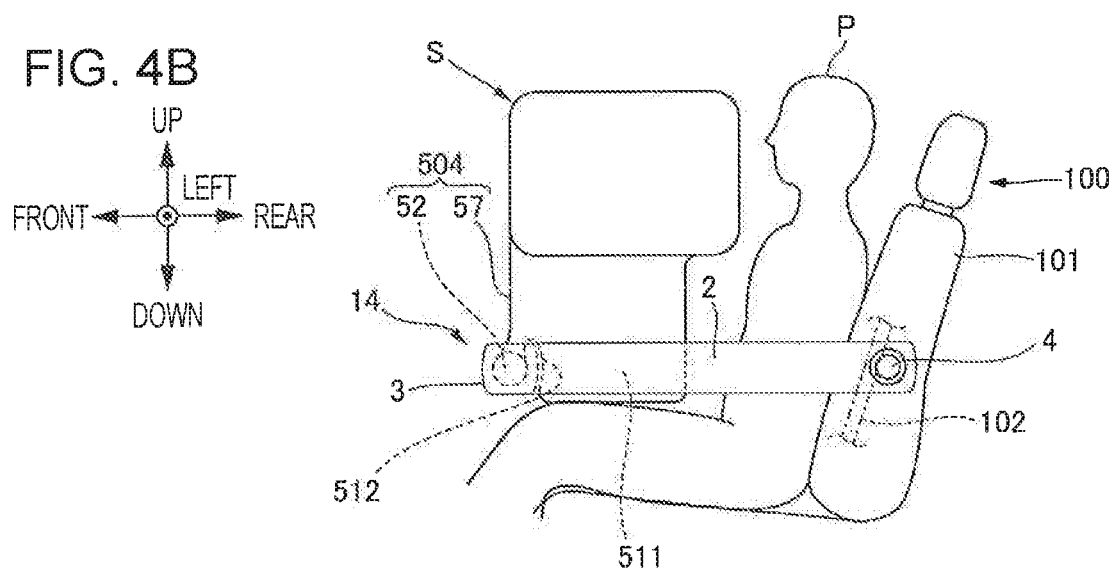
Figure 4C:
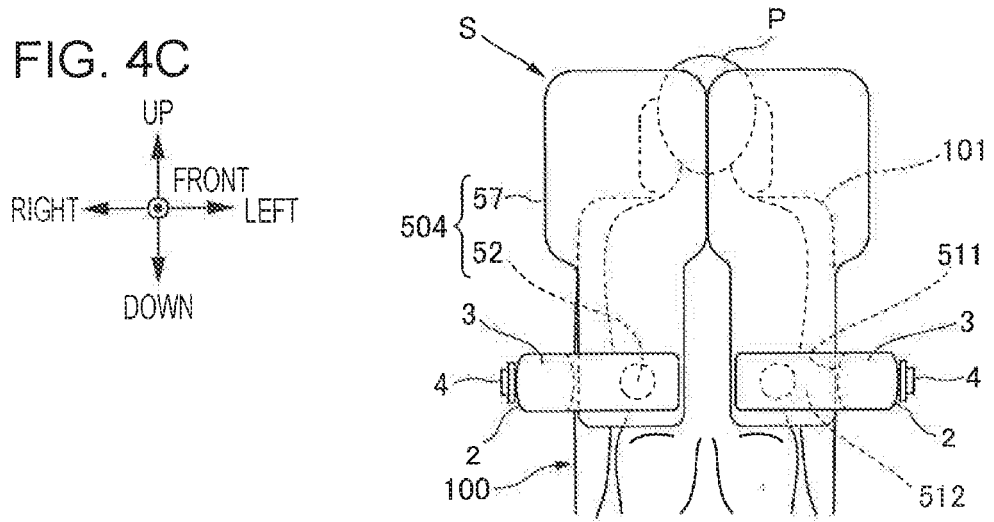

FIGS. 3A to 3C schematically illustrate arm rests 11, 12, and 13 according to other examples of the present invention. FIG. 3A is a side view schematically illustrating a seat 100 equipped with an arm rest 11 having airbags 501 according to another example of the present invention. FIG. 3B is a plan view schematically illustrating a seat 100 equipped with an arm rest 12 having airbags 502 according to another example of the present invention. FIG. 3C is a plan view schematically illustrating a seat 100 equipped with an arm rest 13 having airbags 503 according to another example of the present invention. FIGS. 4A to 4C schematically illustrate a seat 100 equipped with an arm rest 14 from which airbags 504 according to an example of the present invention are deployed. FIG. 4A is a plan view schematically illustrating the seat 100, FIG. 4B is a side view schematically illustrating the seat 100, and FIG. 4C is a front view schematically illustrating the seat 100.

Components similar to those in the example illustrated in FIGS. 1A to 2B will be given the same reference signs, and detailed descriptions thereof will be omitted.

In the example illustrated in FIG. 3A, the airbags 501 are provided in place of the above-described airbags 5.

The airbags 501 differ from the above-described airbags in that airbag bodies 53 of the airbags 501 have a substantially triangular pyramidal shape, whereas the above-described airbag bodies 51 have a substantially triangular prismatic shape.

The airbag bodies 53 are similar to the above-described airbag bodies 51 in being provided with lateral abutment units 511 and front abutment units 512, but are different therefrom in that occupant abutment units 514 are sloped surfaces sloped forward and outward in the width direction of the seat 100. Each occupant abutment unit 514 according to this example is formed of a surface substantially orthogonal to the tangential direction of a leaning trajectory of the upper body and the head of the vehicle occupant P in a case where the vehicle occupant P leans forward about the waist restrained by the seatbelt in the event of a collision.

With the airbag bodies 53 having the occupant abutment units 514, the airbag bodies 53 can receive the upper body and the head of the leaning vehicle occupant P over a wide range, such as a surface, instead of a point when the vehicle occupant P leans forward in the event of a collision. Thus, the reactive force received by the vehicle occupant P as a result of the vehicle occupant P coming into contact with the airbag bodies 53 is distributed, thereby achieving a highly safe and protected state of the vehicle occupant P.

In the example illustrated in FIG. 3B, the airbags 502 are provided in place of the above-described airbags 5.

The airbags 502 differ from the above-described airbags 5 in that airbag bodies 54 of the airbags 502 have substantially-curved occupant abutment units 515, whereas the occupant abutment units 513 of the above-described airbag bodies 51 are substantially-flat surfaces.

The airbag bodies 54 are similar to the above-described airbag bodies 51 in being provided with lateral abutment units 511 and front abutment units 512, but are different therefrom in that the occupant abutment units 515 are substantially-curved surfaces such that the thickness, in the front-rear direction, of inner regions of the airbag bodies 54 in the width direction of the seat 100 is larger than in the above-described airbag bodies 51. The airbags 502 according to this example deploy rearward from the inflators 52, as indicated by thick solid arrows within the airbag bodies 54.

When a forward collision occurs at high speed, the airbag bodies 54 deploy toward the front surfaces of the upper body and the head of the vehicle occupant P against the moving direction of the vehicle occupant P, so that the vehicle occupant P can be quickly protected. Moreover, with the airbag bodies 54 having the occupant abutment units 515, the airbag bodies 54 have enough thickness, in the front-rear direction, to receive and support high-speed forward movement of the vehicle occupant P during collision, whereby the vehicle occupant P can be reliably protected.

In the example illustrated in FIG. 3C, the airbags 503 are provided in place of the above-described airbags 5.

The above-described airbag bodies 51 are deployed by the inflators 52 provided in the front members 3, and the lateral abutment units 511 and the occupant abutment units 513 extend to positions near the front of the waist or near the thighs of the vehicle occupant P. In contrast, with regard to the airbags 503, airbag bodies 55 are deployed by lateral inflators 56 provided in the side members 2, and the lateral abutment units 511 and occupant abutment units 516 extend to the lateral sides of the upper body of the vehicle occupant P.

The airbag bodies 55 are deployed larger in the front-rear direction than the above-described airbag bodies 51. As indicated by thick solid arrows within the airbag bodies 55, the airbags 503 according to this example deploy laterally in the left-right direction as well as forward from the lateral inflators 56.

In a case where either one of an oblique collision and a lateral collision occurs, the upper body of the vehicle occupant P moves diagonally or laterally, and quick protection is necessary since the distance between the vehicle occupant P and either one of the side member 2 and a door component is small. With the airbags 503 according to this example, the lateral sides of the vehicle occupant can be protected from the early stage of deployment, and the airbag bodies 55 can be readily inserted into the narrow areas between the vehicle occupant P and the side members 2, whereby the vehicle occupant P can be quickly and reliably protected even in the event of either one of an oblique collision and a lateral collision.

Next, in the example illustrated in FIGS. 4A to 4C, the airbags 504 are provided in place of the above-described airbags 5.

The airbags 504 differ from the above-described airbags 5 in that airbag bodies 57 of the airbags 504 have supporters S above substantially triangular prismatic portions, whereas the above-described airbag bodies 51 simply have a substantially triangular prismatic shape.

The airbag bodies 57 are similar to the above-described airbag bodies 51 in being provided with lateral abutment units 511 and front abutment units 512, but are different therefrom in that the supporters S suitable for protecting the head of the vehicle occupant P are provided above the lateral abutment units 511 and the front abutment units 512. The supporters S have occupant abutment units 517 formed of curved surfaces the rear sides of which extend along the head of the vehicle occupant P. The supporters S are provided in the form of blocks having larger thicknesses in the front-rear direction and the left-right direction, as compared with the regions where the lateral abutment units 511 and the front abutment units 512 are provided. The occupant abutment units 517 support the head of the vehicle occupant P from the front and lateral sides when the vehicle occupant P moves forward in the event of a collision.

With the airbag bodies 57 being provided with the supporters S having the occupant abutment units 517, the head of the vehicle occupant P can be particularly restrained and protected in the event of a collision. Even when the vehicle occupant P abuts on the supporters S, the pushing force received by the airbag bodies 57 from the vehicle occupant P is transmitted to the side members 2 and the front members 3 by the lateral abutment units 511 and the front abutment units 512, similar to the above-described examples. Thus, a reactive force is obtained from the side members 2 and the front members 3 by the lateral abutment units 511 and the front abutment units 512, so that a favorable support state of the vehicle occupant P can be achieved via the airbag bodies 57.

In each of the examples of the present invention, the shape, the size, and the position of the supporters S may be appropriately set in accordance with, for instance, the predicted behavior and the physique of the vehicle occupant P, so long as the lateral abutment units 511 and the front abutment units 512 are provided.

According to a further modification of the above examples of the present invention, for instance, the left and right split front members 3 illustrated in FIGS. 1A and 1B may be coupled to each other, such that the side members 2, the coupled front members 3, and either one of the rear member 4 and the seat 100 containing the rear member 4 constitute a ring-shaped structure that is substantially rectangular in plan view. Thus, the vehicle occupant P is surrounded by the arm rest when the arm rest is in use.

Even if the vehicle cabin deforms in the event of a forward collision, an oblique collision, a lateral collision, and so on and an incoming object occurs in the vehicle cabin, the vehicle occupant P can be directly protected from the incoming object since the arm rest is disposed along the entire perimeter between the incoming object and the vehicle occupant P. In particular, in the event of an oblique collision and a lateral collision, door components and vehicle-body components tend to enter the vehicle cabin as incoming objects. Even if a door component deforms into the vehicle cabin, the arm rest equipped with the side members 2 and the front members 3 can suppress or prevent direct contact of the door component with the vehicle occupant P.

As another modification, one of the side members 2 of the arm rest according to each of the examples of the present invention may be integrated with the door trim. In this case, the front members 3 are split at the left and right sides when not in use. Moreover, the side member 2 at the door side is a stationary member and does not rotate.

Although the examples of the present invention made by the present inventor have been described above, the examples of the present invention are not limited by the description and drawings that constitute a part of the disclosure of the present invention. In other words, it should be noted that other examples, applications, technologies, and so on achievable by a skilled person based on the above examples are all included in the scope of the present invention.

According to the examples of the present invention, the airbags deploy from the front members disposed closer to the vehicle occupant than other members disposed in the vehicle, and the deployed airbags abut on the front members and the side members. Thus, the vehicle occupant moving forward, diagonally, or laterally due to a collision can be supported by the side members and the front members via the airbags, thereby providing an arm rest that can protect the vehicle occupant quickly and reliably from a close position by using airbags having a lower capacity than in the related art.

The invention claimed is:

1. An arm rest attachable to a seat for a vehicle occupant to sit on, the arm rest comprising:
   a pair of side members configured to be at left and right sides of the vehicle occupant when the vehicle occupant is seated, the side members extending in a front-rear direction and being coupled to the seat;
   a pair of front members configured to be in front of the vehicle occupant when the vehicle occupant is seated and extending inward in a width direction of the seat from the pair of side members; and
   an airbag configured to deploy toward the vehicle occupant from at least one of the pair of side members or the pair of front members,
   wherein the airbag comprises,
   a lateral abutment unit configured to abut on an adjacent most one of the side members; and
   a front abutment unit configured to abut on an adjacent most one of the front members,
   wherein, when in a fully deployed, pre-passenger contact state, the airbag has a substantially-triangular cross section taken in a substantially horizontal direction,
   the substantially-triangular cross section including:
   a first linear side wall of the lateral abutment unit extending linearly along a side wall of the adjacent most one of the side members, and abutting the side wall of the adjacent most one of the side members over the entire length of the first linear side wall;
   a second linear side wall of the front abutment unit extending linearly along a side wall of the adjacent most one of the front members; and
   a third side wall extending inward from a vertex region defined by a rear end of the first linear side wall and a rear end of the third side wall.

2. The arm rest according to claim 1,
   wherein the airbag is configured to deploy laterally and forward from the side members.

3. The arm rest according to claim 2,
   wherein the airbag comprises a supporter configured to support at least one of an upper body or a head of the vehicle occupant above the lateral abutment unit and the front abutment unit.

4. The arm rest according to claim 2, further comprising:
   a rear member that couples the seat to rear sides of the side members,
   wherein the front members couple the left and right side members to each other, and
   wherein the side members, the front members, and either one of the rear member and the seat constitute a ring-shaped structure.

5. The arm rest according to claim 1,
   wherein the airbag is configured to deploy rearward from the front members.

6. The arm rest according to claim 5,
   wherein the airbag comprises a supporter configured to support at least one of an upper body or a head of the vehicle occupant above the lateral abutment unit and the front abutment unit.

7. The arm rest according to claim 5, further comprising:
a rear member that couples the seat to rear sides of the side members,
wherein the front members couple the left and right side members to each other, and
wherein the side members, the front members, and either one of the rear member and the seat constitute a ring-shaped structure.

8. The arm rest according to claim 1,
wherein the airbag comprises a supporter configured to support at least one of an upper body or a head of the vehicle occupant above the lateral abutment unit and the front abutment unit.

9. The arm rest according to claim 8, further comprising:
a rear member that couples the seat to rear sides of the side members,
wherein the front members couple the left and right side members to each other, and
wherein the side members, the front members, and either one of the rear member and the seat constitute a ring-shaped structure.

10. The arm rest according to claim 1, further comprising:
a rear member that couples the seat to rear sides of the side members,
wherein the front members couple the left and right side members to each other, and
wherein the side members, the front members, and either one of the rear member and the seat constitute a ring-shaped structure.

11. The arm rest according to claim 1, wherein the front members each extend inwardly to a greater extent than a length of a widthwise gap formed between opposing free ends of the front members.

12. The arm rest according to claim 1, wherein the airbag is configured to expand down below a lower surface of an adjacent most arm rest when in a fully deployed, pre-passenger contact state.

13. The arm rest according to claim 1, wherein the third side wall is, at least partially, a linear side wall that features a linear portion extending inward and forward from the vertex region defined by the rear end of the first linear side wall and the rear end of the third, at least partially, linear side wall.

14. The arm rest according to claim 1, wherein the lateral abutment unit is also configured to extend, when in a fully deployed, pre-passenger contact state, over and above the adjacent most side member.

15. The arm rest according to claim 14, wherein the front abutment unit is configured to extend, when in a fully deployed, pre-passenger contact state, over and above the adjacent most front member.

16. The arm rest according to claim 1, wherein the front abutment unit is configured to extend, when in a fully deployed, pre-passenger contact state, over and above the adjacent most front member.

17. The arm rest according to claim 1, wherein the second linear side wall of the front abutment unit is configured to extend, when in a fully deployed, pre-passenger contact state, in linear fashion over a full widthwise length of the adjacent most one of the front members.

18. The arm rest according to claim 1, wherein the third linear side wall is linear over an entire length between the vertex region and a front end of the second linear side wall.

19. The arm rest according to claim 1, wherein the lateral abutment unit is also configured to extend, when in a fully deployed, pre-passenger contact state, over and above the adjacent most arm rest, and the airbag further comprises a head contact support member that, when the airbag is in a fully deployed, pre-passenger contact state, has a side wall extending up away from a widthwise outer portion of the lateral abutment unit that is positioned over and above the adjacent most arm rest.

20. An arm rest attachable to a seat for a vehicle occupant to sit on, the arm rest comprising:
a pair of side members configured to be at left and right sides of the vehicle occupant when the vehicle occupant is seated, the side members extending in a front-rear direction and being coupled to the seat;
a pair of front members configured to be in front of the vehicle occupant when the vehicle occupant is seated and extending inward in a width direction of the seat from the pair of side members; and
an airbag configured to deploy toward the vehicle occupant from at least one of the pair of side members or the pair of front members,
wherein the airbag comprises a lateral abutment unit configured to abut on an adjacent most side member and a front abutment unit configured to abut on an adjacent most front member, the airbag having a substantially-triangular cross section taken in a substantially horizontal direction, the cross section including the lateral abutment unit and the front abutment unit; and the arm rest further comprising:
a rear member that couples the seat to rear sides of the side members,
wherein the front members couple the left and right side members to each other, and
wherein the side members, the front members, and either one of the rear member and the seat constitute a ring-shaped structure.

* * * * *